(12) United States Patent
Debates et al.

(10) Patent No.: US 9,971,059 B2
(45) Date of Patent: May 15, 2018

(54) DETECTION OF STOWED STATE FOR DEVICE

(71) Applicant: Motorola Mobility LLC, Chicago, IL (US)

(72) Inventors: Scott Debates, Crystal Lake, IL (US); Douglas A Lautner, Round Lake, IL (US); Jagatkumar Shah, Lake in the Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 248 days.

(21) Appl. No.: 14/995,240

(22) Filed: Jan. 14, 2016

(65) Prior Publication Data

US 2017/0192123 A1 Jul. 6, 2017

Related U.S. Application Data

(60) Provisional application No. 62/273,063, filed on Dec. 30, 2015.

(51) Int. Cl.
| | |
|---|---|
| *G01V 8/10* | (2006.01) |
| *G01J 1/42* | (2006.01) |
| *G01J 1/02* | (2006.01) |

(52) U.S. Cl.
CPC .............. *G01V 8/10* (2013.01); *G01J 1/0228* (2013.01); *G01J 1/4204* (2013.01)

(58) Field of Classification Search
CPC .. G01V 8/10; G01J 1/42; G01J 1/4204; G01J 1/0228
USPC .......................................... 250/214 AL, 221
See application file for complete search history.

(56) References Cited

U.S. PATENT DOCUMENTS

| | | | |
|---|---|---|---|
| 7,675,503 B2* | 3/2010 | Goodwin, III | .......... G06F 3/002 340/5.91 |
| 9,152,211 B2* | 10/2015 | Gunn | .................... G06F 3/0488 |

* cited by examiner

*Primary Examiner* — Seung C Sohn
(74) *Attorney, Agent, or Firm* — Amerson Law Firm, PLLC

(57) ABSTRACT

A method includes illuminating at least a portion of a display proximate an ambient light sensor of a device, detecting a first light measurement using the ambient light sensor responsive to the illuminating, and generating an asserted value for a proximity state of the device based on the light measurement exceeding a first predetermined threshold. A device includes a display, an ambient light sensor, and a processor coupled to the display and the ambient light sensor to illuminate at least a portion of the display proximate the ambient light sensor, detect a first light measurement using the ambient light sensor with the display illuminated, and generate an asserted value for a proximity state of the device based on the light measurement exceeding a first predetermined threshold.

20 Claims, 3 Drawing Sheets

US 9,971,059 B2

DETECTION OF STOWED STATE FOR DEVICE

BACKGROUND

Field of the Disclosure

The disclosed subject matter relates generally to mobile computing systems and, more particularly, to detecting a stowed state for a device.

Description of the Related Art

Electronic devices often include a portable power source or battery so that they are not confined by a direct electrical line to a power outlet. While these power sources allow the electronic devices to be portable, the power sources have a limited power to supply the portable electronic device. In order to extend the life of the power source and operation of the device, electronic circuitry of the device is used to manage power consumption by the device efficiently.

Since there are times when power is not required by the portable electronic device, the electronic circuitry of the device may be used to detect these situations and reduce power or power-down the device to conserve power. There may also be a need to minimize accidental actions of the portable electronic device, such as dialing of a contact.

One type of situation where a portable electronic device may reduce power or power-down, and/or minimize accidental actions is a situation where the device is positioned with an accessory. When a portable electronic device is positioned within an accessory, such as a carrying case, a device holder, or a bag, it is often referred to as a "stowed" situation for the device. It may be desirable for the device to reduce power consumption and/or minimize accidental actions during a stowed situation, because the situation indicates that a user of the device is not operating, or may not have a need to operate, the device at that time.

In some cases, a device may employ a proximity sensor to detect the physical proximity of an object next to the device when identifying a stowed condition. However, there are instances where a device may be placed in a loose enclosure, such as a pocket, a handbag, a backpack, etc., where the device may actually be considered by the user to be stowed, but not close enough to an object in the enclosure to allow detection by the proximity sensor.

The present disclosure is directed to various methods and devices that may solve or at least reduce some of the problems identified above.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF EMBODIMENT(S)

Figure 1:
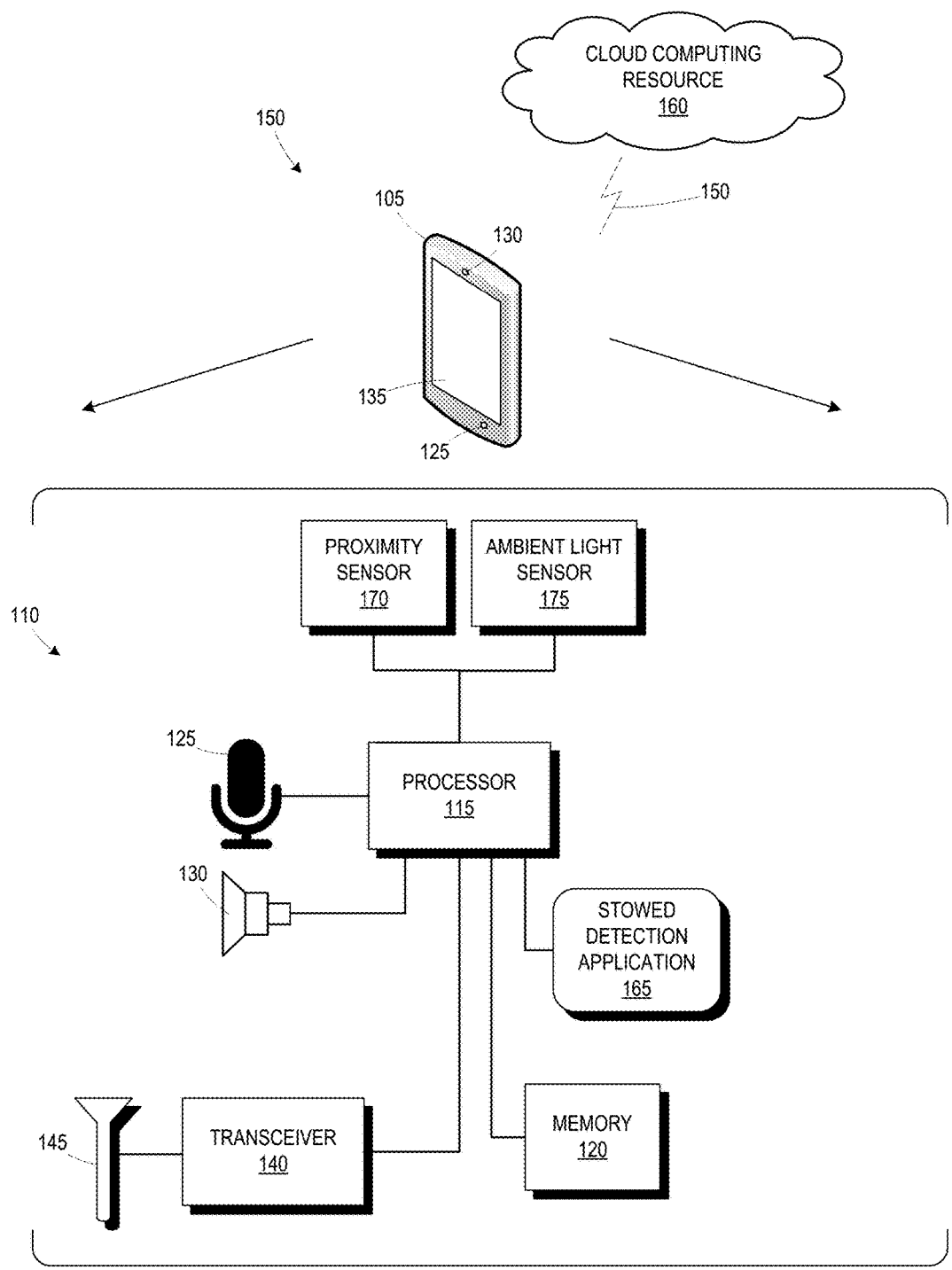
FIG. 1 is a simplified block diagram of a communication device configured to detect a stowed state of the device, in accordance with some embodiments.
Figure 2:
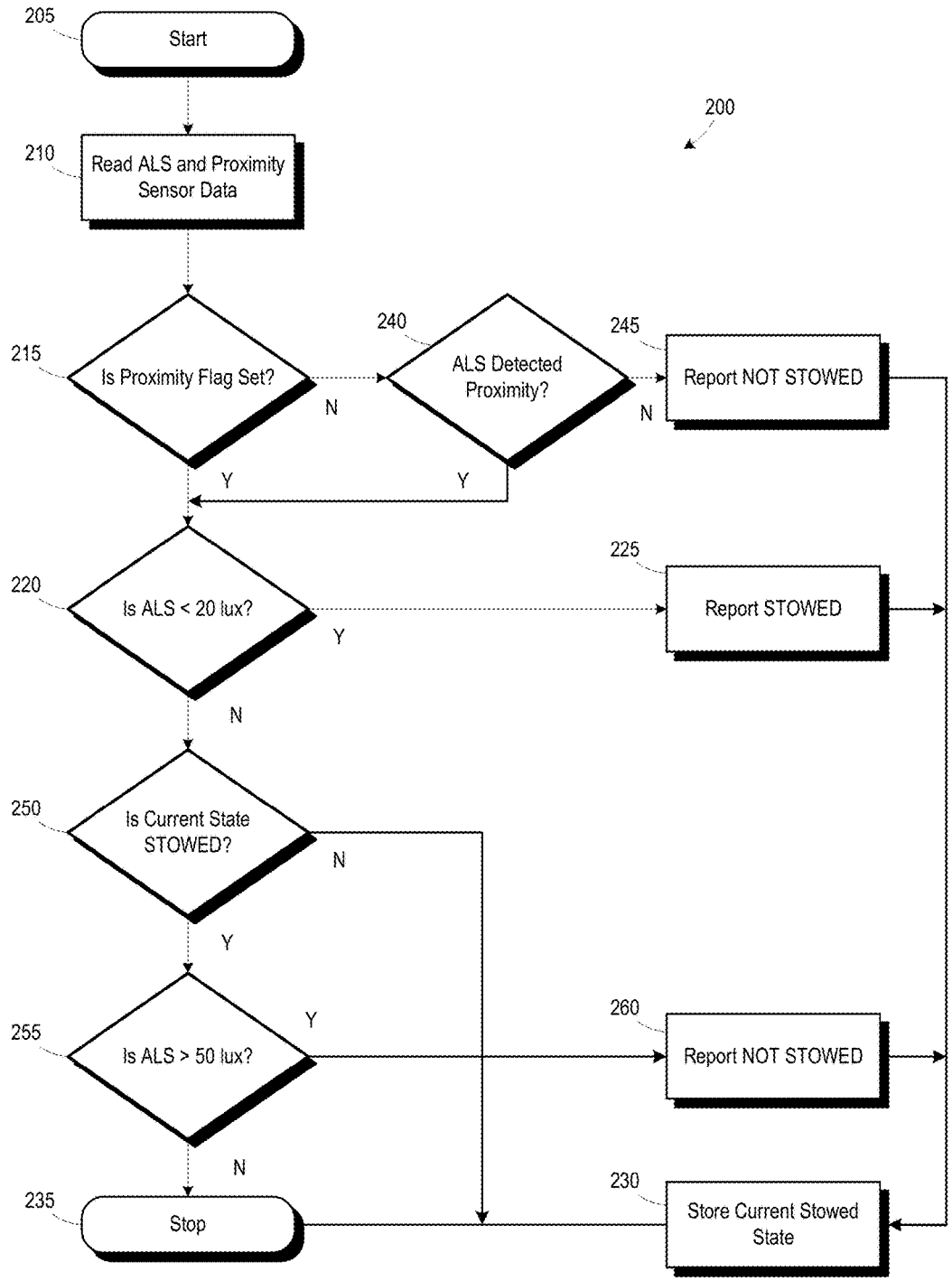
FIG. 2 is a flow diagram of a method for detecting a stowed state of a device, in accordance with some embodiments.
Figure 3:
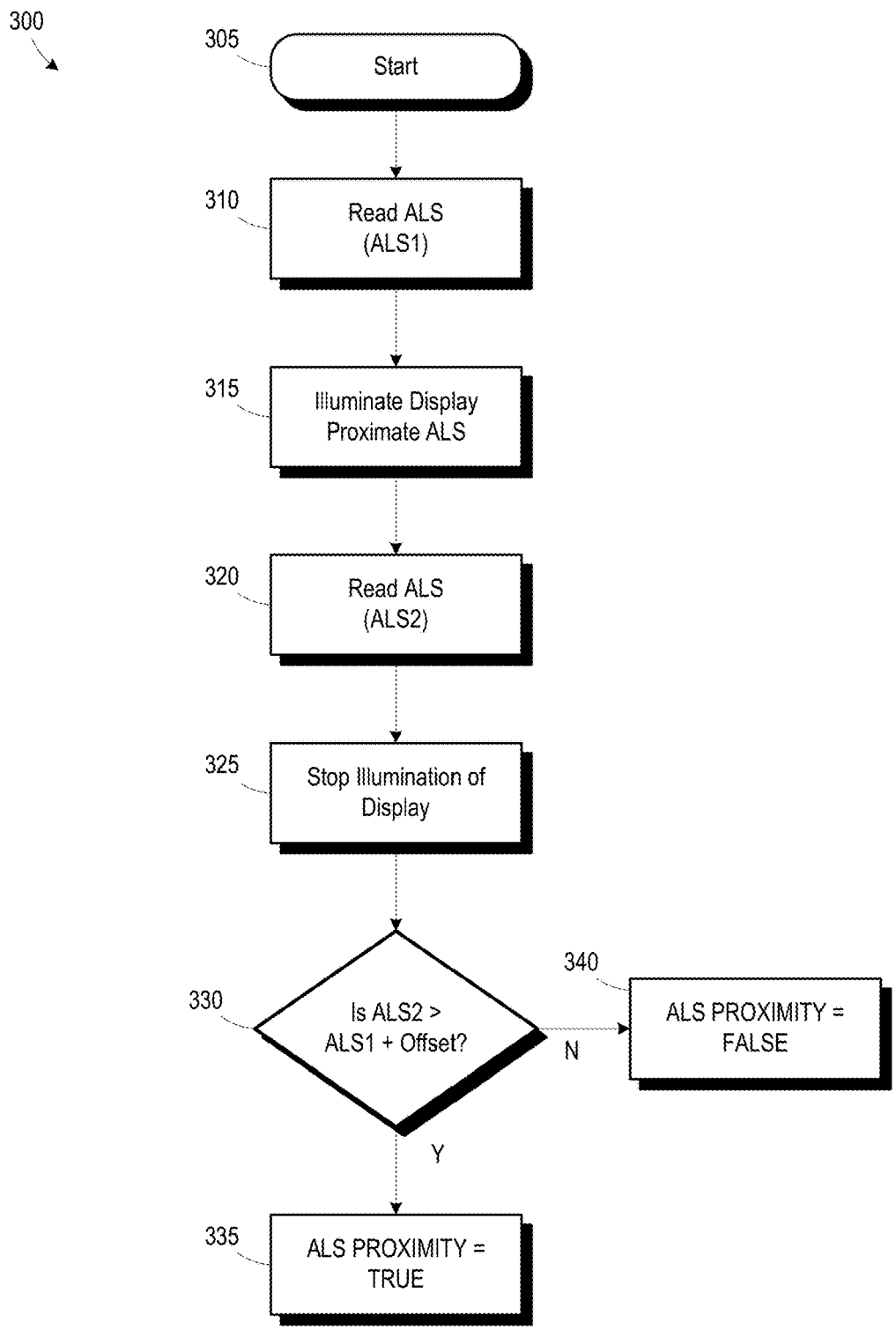
FIG. 3 is a flow diagram of a method for detecting a proximity state of a device using an ambient light sensor, in accordance with some embodiments.

FIGS. 1-3 illustrate example techniques for detecting a stowed state for a device. In one example, a device may detect a proximity state by illuminating at least a portion of a display proximate an ambient light sensor of a device and measuring light using the ambient light sensor to thereby detect the proximity of an object near the device. The proximity state detection using the ambient light sensor may allow the device to identify a stowed state for the device.

FIG. 1 is a simplistic block diagram of a device 105. The device 105 implements a computing system 110 including, among other things, a processor 115, a memory 120, a microphone 125, a speaker 130, and a display 135. The memory 120 may be a volatile memory (e.g., DRAM, SRAM) or a non-volatile memory (e.g., ROM, flash memory, etc.), or a combination thereof. The device 105 includes a transceiver 140 for transmitting and receiving signals via an antenna 145 over a communication link 150. The transceiver 140 may include one or more radios for communicating according to different radio access technologies, such as cellular, Wi-Fi, Bluetooth®, ZigBee, etc. The communication link 150 may have a variety of forms. In some embodiments, the communication link 150 may be a wireless radio or cellular radio link. The communication link 150 may also communicate over a packet-based communication network, such as the Internet. In one embodiment, a cloud computing resource 160 may interface with the device 105 to implement one or more of the functions described herein. In various embodiments, the device 105 may be embodied in handheld or wearable devices, such as a laptop computers, handheld computers, tablet computers, mobile devices, telephones, personal data assistants, music players, game devices, wearable computing devices, and the like.

In the device 105, the processor 115 may execute instructions stored in the memory 120 and store information in the memory 120, such as the results of the executed instructions. Some embodiments of the processor 115, the memory 120, and the microphone 125 may be configured to implement a stowed detection application 165 that perform portions methods 200, 300 shown in FIGS. 2 and 3, respectively, and discussed in greater detail below. For example, the processor 115 may execute the stowed detection application 165 to detect a stowed state for the device. One or more aspects of the methods 200, 300 may also be implemented using the cloud computing resource 160 in addition to the stowed detection application 165. The device 105 may be equipped with one or more sensors for use by the stowed detection application 165, such as, for example, a proximity sensor 170 and an ambient light sensor (ALS) 175.

FIG. 2 is a flow diagram of a method 200 for detecting a stowed state of the device 105, in accordance with some embodiments. The method 200 is initiated in method block 205. A flag may be set in the device 105 enabling or disabling stowed state detection. The method 200 may be initiated based on usage context of the device 105, such as after device activity changes (e.g., terminating a call) or at a predetermined frequency.

In method block 210, the stowed detection application 165 reads a light measurement from the ALS 175 and a proximity state from the proximity sensor 170. If the proximity flag is set in method block 215 and the ALS reading is less than 20 lux in method block 220, indicating a low light level, the stowed detection application 165 reports a "STOWED" state in method block 225. The stowed state is stored in method block 230, and the method 200 terminates in method block 235.

In some cases, the device 105 may be stowed in a loose enclosure (e.g., pocket, handbag, backpack, etc.), such that the proximity sensor 170 fails to detect a proximity state. The stowed detection application 165 employs an alternative proximity state detection using the ALS 175 in method block 240 if the proximity flag is not set in method block 215.

FIG. 3 is a flow diagram of a method 300 for detecting a proximity state of a device using the ambient light sensor 175 (i.e., in method block 240), in accordance with some embodiments.

The method 300 starts in method block 305. The stowed detection application 165 reads a light measurement from the ALS 175 (designated as ALS1) in method block 310. In method block 315, the stowed detection application 165 illuminates at least a portion of the display 135 proximate the ALS 175. For example, the illumination may include a white screen portion with maximum backlighting.

In method block 320, the stowed detection application 165 reads the ALS 175 while the display 135 is illuminated (designated as ALS 2). In method block 325, the illumination of the display 135 is terminated.

In method block 330, the stowed detection application 165 determines if the ambient light measurement taken with the display 135 illuminated is greater than the ambient light measurement prior to the illumination. If the device 105 is in a loose enclosure, a portion of the light may be reflected back to the ALS 175, allowing the stowed detection application 165 to identify an object proximate the device 105. An offset (e.g., 0-3 lux) may be used to set a threshold value for the comparison, ALS2>ALS1+Offset.

If the comparison in method block 330 is met, the ALS proximity state is reported as "true" in method block 335. Otherwise the ALS proximity state is reported as "false" in method block 340.

Returning to FIG. 2, the method 200 continues in method block 240 based on the ALS proximity state. If the ALS proximity state is "false" in method block 240, the stowed state is reported as "NOT STOWED" in method block 245 and stored in method block 230. If the ALS proximity state is "true" in method block 245, the method proceeds to method block 220 as described above.

If the ALS reading in method block 220 is not <20 lux in method block 220, and the current state is not "STOWED" in method block 250, the method terminates in method block 235.

If the current state is "STOWED" in method block 250, the stowed detection application 165 determines if the ALS reading is greater than 50 lux in method block 255. If the ALS reading is greater than 50 lux in method block 255, the stowed detection application 165 reports the state as "NOT STOWED" in method block 260 and the state is stored in method block 230. The higher ALS reading indicates that the device 105 has been withdrawn from the enclosure. If the ALS reading is greater than 50 lux in method block 255, the method terminates in method block 235.

The method of 300 provides an alternative technique for detecting proximity. The method 300. In a device 105 without a proximity sensor 170, the ALS proximity detection may take the place of the processing described in method block 215 to allow stowed detection in such a device 105.

The values of the thresholds in method blocks 220 and 255 are provided for illustrative purposes and may vary depending on the particular application.

In some embodiments, the device 105 may have a low power mode where the stowed detection application 165 periodically compares the ambient light sensor 175 measurement against a predetermined threshold and only initiates the method 200 if the ALS reading is less than the threshold.

In some embodiments, certain aspects of the techniques described above may implemented by one or more processors of a processing system executing software. The method 200 described herein may be implemented by executing software on a computing device, such as the processor 115 of FIG. 1, however, such methods are not abstract in that they improve the operation of the device 105 and the user's experience when operating the device 105. Prior to execution, the software instructions may be transferred from a non-transitory computer readable storage medium to a memory, such as the memory 120 of FIG. 1.

The software may include one or more sets of executable instructions stored or otherwise tangibly embodied on a non-transitory computer readable storage medium. The software can include the instructions and certain data that, when executed by one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

A method includes illuminating at least a portion of a display proximate an ambient light sensor of a device, detecting a first light measurement using the ambient light sensor responsive to the illuminating, and generating an asserted value for a proximity state of the device based on the light measurement exceeding a first predetermined threshold.

A device includes a display, an ambient light sensor, and a processor coupled to the display and the ambient light sensor to illuminate at least a portion of the display proximate the ambient light sensor, detect a first light measurement using the ambient light sensor with the display illuminated, and generate an asserted value for a proximity state of the device based on the light measurement exceeding a first predetermined threshold.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed is:

1. A method, comprising:
    illuminating at least a portion of a display proximate an ambient light sensor of a device;
    detecting a first light measurement using the ambient light sensor responsive to the illuminating; and
    generating an asserted value for a proximity state of the device based on the light measurement exceeding a first predetermined threshold.

2. The method of claim 1, further comprising detecting a second light measurement using the ambient light sensor prior to the illuminating, wherein the first predetermined threshold comprises the second light measurement.

3. The method of claim 1, further comprising detecting a second light measurement using the ambient light sensor prior to the illuminating, wherein the first predetermined threshold comprises the second light measurement plus an offset.

4. The method of claim 1, further comprising:
    terminating the illuminating;
    detecting a second light measurement using the ambient light sensor after terminating the illuminating; and
    generating an asserted value for a stowed state of the device responsive to the proximity state having an asserted value and the second light measurement being less than a second predetermined threshold.

5. The method of claim 4, further comprising generating a deasserted value for the stowed state responsive to the second light measurement being greater than a second predetermined threshold.

6. The method of claim 1, further comprising:
    determining a proximity flag for the device using a proximity sensor; and
    performing the illuminating, the detecting of the first light measurement, and the generating of the proximity state responsive to the proximity flag having a deasserted value.

7. The method of claim 6, further comprising:
    terminating the illuminating;
    detecting a second light measurement using the ambient light sensor after terminating the illuminating; and
    generating an asserted value for a stowed state of the device responsive to the proximity state having an asserted value and the second light measurement being less than a second predetermined threshold.

8. The method of claim 7, further comprising generating a deasserted value for the stowed state responsive to the second light measurement being greater than a second predetermined threshold.

9. A method, comprising:
    determining a proximity flag for a device using a proximity sensor;
    generating an asserted value for a proximity state responsive to the proximity flag having an asserted value;
    responsive to the proximity flag having a deasserted value,
        illuminating at least a portion of a display proximate an ambient light sensor of a device;
        detecting a first light measurement using the ambient light sensor responsive to the illuminating;
        generating an asserted value for the proximity state of the device based on the light measurement exceeding a first predetermined threshold; and
        terminating the illuminating;
    detecting a second light measurement using the ambient light sensor; and
    generating an asserted value for a stowed state of the device responsive to the proximity state having an asserted value and the second light measurement being less than a second predetermined threshold.

10. The method of claim 9, further comprising generating a deasserted value for the stowed state responsive to the second light measurement being greater than a second predetermined threshold.

11. A device, comprising:
    a display;
    an ambient light sensor; and
    a processor coupled to the display and the ambient light sensor to illuminate at least a portion of the display proximate the ambient light sensor, detect a first light measurement using the ambient light sensor with the display illuminated, and generate an asserted value for a proximity state of the device based on the light measurement exceeding a first predetermined threshold.

12. The device of claim 11, wherein the processor is to detect a second light measurement using the ambient light sensor prior to illuminating the display, wherein the first predetermined threshold comprises the second light measurement.

13. The device of claim 11, wherein the processor is to detect a second light measurement using the ambient light sensor prior to illuminating the display, wherein the first predetermined threshold comprises the second light measurement plus an offset.

14. The device of claim 11, wherein the processor is to terminate the illuminating, detect a second light measurement using the ambient light sensor after terminating the illuminating, and generate an asserted value for a stowed state of the device responsive to the proximity state having an asserted value and the second light measurement being less than a second predetermined threshold.

15. The device of claim 14, wherein the processor is to generate a deasserted value for the stowed state responsive to the second light measurement being greater than a second predetermined threshold.

16. The device of claim 11, further comprising a proximity sensor coupled to the processor, wherein the processor is to read a proximity flag for the device from the proximity sensor and perform the illuminating, the detecting of the first light measurement, and the generating of the proximity state responsive to the proximity flag having a deasserted value.

17. The device of claim 16, wherein the processor is to terminate the illuminating, detect a second light measurement using the ambient light sensor after terminating the illuminating, and generate an asserted value for a stowed state of the device responsive to the proximity state having an asserted value and the second light measurement being less than a second predetermined threshold.

18. The device of claim 17, wherein the processor is to generate a deasserted value for the stowed state responsive to the second light measurement being greater than a second predetermined threshold.

19. The device of claim 11, further comprising:
a proximity sensor coupled to the processor,
wherein the processor is to read a proximity flag for the device from the proximity sensor, generate an asserted value for the proximity state responsive to the proximity flag having an asserted value, and responsive to the proximity flag having a deasserted value, illuminate the at least a portion of the display proximate the ambient light sensor, detect the first light measurement, generate an asserted value for the proximity state based on the light measurement exceeding a first predetermined threshold, and terminate the illuminating, wherein the processor is further to detect a second light measurement using the ambient light sensor and generate an asserted value for a stowed state of the device responsive to the proximity state having an asserted value and the second light measurement being less than a second predetermined threshold.

20. The device of claim 19, wherein the processor is to generate a deasserted value for the stowed state responsive to the second light measurement being greater than a second predetermined threshold.

* * * * *